(12) United States Patent
Beardsell (10) Patent No.: US 12,485,393 B2
(45) Date of Patent: Dec. 2, 2025

(54) SHAKER BOTTLE FOR PREPARING A HEALTH NUTRIENT

(71) Applicant: SHAKESPHERE PRODUCTS LIMITED, Newcastle Under Lyme (GB)

(72) Inventor: Rick Beardsell, Prestbury (GB)

(73) Assignee: SHAKESPHERE PRODUCTS LIMITED (GB)

( * ) Notice: Subject to any disclaimer, the term of this patent is extended or adjusted under 35 U.S.C. 154(b) by 0 days.

(21) Appl. No.: 17/774,503

(22) PCT Filed: Feb. 8, 2022

(86) PCT No.: PCT/GB2022/050331
§ 371 (c)(1),
(2) Date: May 5, 2022

(87) PCT Pub. No.: WO2023/105179
PCT Pub. Date: Jun. 15, 2023

(65) Prior Publication Data
US 2024/0325997 A1    Oct. 3, 2024

(30) Foreign Application Priority Data
Dec. 8, 2021 (GB) .................................. 2117739

(51) Int. Cl.
*B01F 33/501* (2022.01)
*A47J 43/27* (2006.01)
(Continued)

(52) U.S. Cl.
CPC ......... *B01F 33/50111* (2022.01); *A47J 43/27* (2013.01); *B01F 23/56* (2022.01);
(Continued)

(58) Field of Classification Search
CPC ............... A47J 41/0005; A47J 41/0077; B01F 33/50111
See application file for complete search history.

(56) References Cited

U.S. PATENT DOCUMENTS 10,301,054 B2     5/2019   Pell et al.
10,968,029 B1 *   4/2021   Rane .................... B65D 81/383
(Continued)

FOREIGN PATENT DOCUMENTS

WO    2016027052 A1    2/2016

*Primary Examiner* — Elizabeth Insler
(74) *Attorney, Agent, or Firm* — Jason C. Cameron (57) ABSTRACT

A shaker bottle is disclosed. The bottle includes a tumbler having a double walled structure, wherein the tumbler comprises a bottom wall internal surface, a side wall internal surface, a bottom wall external surface and a side wall external surface connected with the bottom wall internal surface and the side wall internal surface respectively through an air space arranged in between. The tumbler is configured to generate centrifugal force for shaking the predefined volume of liquid and the one or more consumable ingredients. The bottle includes a lid detachably coupled to the tumbler through one or more coupling mechanisms; an orifice to dispense a content from the internal chamber of the tumbler upon shaking; a closure to open or close the orifice through a sliding movement corresponding to the orifice. The bottle includes at least two rubber plugs removably inserted into respective holes to prevent liquid coolant from flowing out of corresponding air spaces between external and internal walls of the lid and the tumbler.

13 Claims, 7 Drawing Sheets

(51) Int. Cl.

| | | |
|---|---|---|
| *B01F 23/50* | (2022.01) | |
| *B01F 35/45* | (2022.01) | |
| *B01F 35/51* | (2022.01) | |
| *B01F 35/71* | (2022.01) | |
| *B01F 35/92* | (2022.01) | |
| *B65D 21/08* | (2006.01) | |
| *B65D 23/10* | (2006.01) | |
| *B65D 47/28* | (2006.01) | |
| *B65D 51/24* | (2006.01) | |
| *B65D 81/38* | (2006.01) | |
| *B01F 35/30* | (2022.01) | |
| *B01F 35/90* | (2022.01) | |
| *B01F 101/14* | (2022.01) | |

(52) U.S. Cl.
CPC .............. *B01F 35/45* (2022.01); *B01F 35/51* (2022.01); *B01F 35/7163* (2022.01); *B01F 35/718051* (2022.01); *B01F 35/92* (2022.01); *B65D 21/083* (2013.01); *B65D 23/102* (2013.01); *B65D 47/286* (2013.01); *B65D 51/242* (2013.01); *B65D 81/3883* (2013.01); *B01F 2035/351* (2022.01); *B01F 2035/98* (2022.01); *B01F 2101/14* (2022.01)

(56) References Cited

U.S. PATENT DOCUMENTS

| | | | | |
|---|---|---|---|---|
| 2006/0000733 | A1* | 1/2006 | Albritton | A47J 41/02 |
| | | | | 206/432 |
| 2013/0213978 | A1* | 8/2013 | Libourel | A47J 41/02 |
| | | | | 220/592.2 |
| 2015/0250349 | A1 | 9/2015 | Ng et al. | |
| 2017/0066573 | A1* | 3/2017 | Karussi | B65D 81/3869 |
| 2020/0283217 | A1* | 9/2020 | Beardsell | B65D 81/3205 |

* cited by examiner

SHAKER BOTTLE FOR PREPARING A HEALTH NUTRIENT

BACKGROUND

Embodiments of the present disclosure provides a container with integrated components for preparing a drink and more particularly to a shaker bottle for preparing a health nutrient.

Most health nutrition supplements are sold in powdered form, usually as bulk in large containers. Such health nutrition supplements require some form of mixing with a liquid to create desired nutritional beverage prior to consumption. Transporting and consuming such health nutrition supplements in various locations typically requires a user to measure and place a predetermined amount of the supplements in individual plastic baggies. Once the supplements are placed in these plastic baggies, the user then takes these plastic baggies along with the container that is capable of mixing the supplements with a liquid to the remote location. However, in order to overcome such transportation issues, purposely designed shaker bottles are used by the user to blend the nutrition supplements with one or more ingredients.

Conventionally, the shaker bottles available in the market rely up on mixing accessories such as mixing or stirring balls, agitators, whisks, strainers, filters, mesh screens, protrusions, rotating blades to blend meal or protein and supplement powders. However, such mixing accessories cause further mess and distress and rattle around like loose change when transported. In addition, a lot of powdered ingredients lumps and stick to the corners of the shaker bottle. As a result, because of these powdered ingredients next time the health nutrient is drunk from it damages health of the user. This is because the wasted mixture causes accelerated harmful bacteria build-up consisting of approximately 17% E-Coli and 27% Strep. Also, a traditional flip cap of the shaker bottle gathers supplements on the underside which can either clog up mixability or when opened drip down the apparel you are wearing. In addition, flip caps vary dramatically with the ease of opening, some are a wrestling match to open whilst other enables deposition of precious supplements in a kit bag by flipping open too easily.

Hence, there is a need for an improved a shaker bottle for preparing a health nutrient in order to address the aforementioned issues.

BRIEF DESCRIPTION

In accordance with an embodiment of the present disclosure, a shaker bottle for preparing a health nutrient is disclosed. The bottle includes a tumbler having a double walled structure, wherein the tumbler comprises a bottom wall internal surface and a side wall internal surface, wherein the bottom wall internal surface and the side wall internal surface are integrated to form an internal chamber adapted to hold a predefined volume of liquid and one or more consumable ingredients. The tumbler also includes a bottom wall external surface and a side wall external surface connected with the bottom wall internal surface and the side wall internal surface respectively through an air space arranged in between thereby forming an air cavity between the double walled structure. The tumbler is configured to generate centrifugal force for shaking the predefined volume of liquid and the one or more consumable ingredients. The shaker bottle also includes a lid detachably coupled to the tumbler through one or more coupling mechanisms. The lid includes a side wall interior surface and a top wall interior surface connected with a smooth transition surface to define a mixing chamber. The lid also includes a side wall exterior surface and a top wall exterior surface connected with the side wall interior surface and the top wall interior surface through enclosed air space. The lid also includes an orifice provided at the top wall exterior surface, wherein the orifice is configured to dispense a content from the internal chamber of the tumbler upon shaking the predefined volume of liquid and the one or more ingredients. The lid also includes a platform arranged on the top wall exterior surface of the lid, wherein the platform is adjacent to the orifice with an integral track and a plurality of notches, wherein the integral track is disposed on sides of the platform and the notches are provided at the surface of the platform. The lid also includes a closure coupled with the platform, wherein the closure is configured to open or close the orifice through a sliding movement corresponding to the orifice, wherein the closure at a lower surface comprises a cavity with a channel arranged for receiving the integral track and a resilient detent arranged in spaced relation within the cavity, wherein the resilient detent is configured for cooperating with the plurality of notches to lock the closure in a predefined position along the platform. The bottle also includes at least two holes. A first hole of the at least two holes is formed in the lid such that the first hole extends from the top wall exterior surface of the lid into the enclosed airspace of the lid. A liquid coolant is filled into the enclosed airspace through the first hole. A second hole of the at least two holes is formed in the tumbler such that the second hole extends from the bottom wall external surface of the tumbler to the airspace. The liquid coolant is filled into the airspace through the second hole. Furthermore, the bottle includes at least two rubber plugs. A first rubber plug of the at least two rubber plugs is removably inserted into the first hole. The first rubber plug is configured to prevent the liquid coolant filled into the enclosed airspace of the lid from leaking out through the first hole when inserted. Similarly, a second rubber plug of the at least two rubber plugs is removably inserted into the second hole. The second rubber plug is configured to prevent the liquid coolant filled into the airspace of the tumbler from leaking out through the second hole when inserted.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 5 A represents a schematic representation of a front view of a shaker jug in accordance with an embodiment of a present disclosure; and FIG. 5 B represents a schematic representation of a side view of a shaker jug in accordance with an embodiment of a present disclosure[[.]];

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a shaker bottle for preparing a health nutrient is disclosed. The bottle includes a tumbler having a double walled structure, wherein the tumbler comprises a bottom wall internal surface and a side wall internal surface, wherein the bottom wall internal surface and the side wall internal surface are integrated to form an internal chamber adapted to hold a predefined volume of liquid and one or more consumable ingredients. The tumbler also includes a bottom wall external surface and a side wall external surface connected with the bottom wall internal surface and the side wall internal surface respectively through an air space arranged in between thereby forming an air cavity between the double walled structure. The tumbler is configured to generate centrifugal force for shaking the predefined volume of liquid and the one or more consumable ingredients. The shaker bottle also includes a lid detachably coupled to the tumbler through one or more coupling mechanisms. The lid includes a side wall interior surface and a top wall interior surface connected with a smooth transition surface to define a mixing chamber. The lid also includes a side wall exterior surface and a top wall exterior surface connected with the side wall interior surface and the top wall interior surface through enclosed air space. The lid also includes an orifice provided at the top wall exterior surface, wherein the orifice is configured to dispense a content from the internal chamber of the tumbler upon shaking the predefined volume of liquid and the one or more ingredients. The lid also includes a platform arranged on the top wall exterior surface of the lid, wherein the platform is adjacent to the orifice with an integral track and a plurality of notches, wherein the integral track is disposed on sides of the platform and the notches are provided at the surface of the platform. The lid also includes a closure coupled with the platform, wherein the closure is configured to open or close the orifice through a sliding movement corresponding to the orifice, wherein the closure at a lower surface comprises a cavity with a channel arranged for receiving the integral track and a resilient detent arranged in spaced relation within the cavity, wherein the resilient detent is configured for cooperating with the plurality of notches to lock the closure in a predefined position along the platform. The bottle also includes at least two holes. A first hole of the at least two holes is formed in the lid such that the first hole extends from the top wall exterior surface of the lid into the enclosed airspace of the lid. A liquid coolant is filled into the enclosed airspace through the first hole. A second hole of the at least two holes is formed in the tumbler such that the second hole extends from the bottom wall external surface of the tumbler to the airspace. The liquid coolant is filled into the airspace through the second hole. Furthermore, the bottle includes at least two rubber plugs. A first rubber plug of the at least two rubber plugs is removably inserted into the first hole. The first rubber plug is configured to prevent the liquid coolant filled into the enclosed airspace of the lid from leaking out through the first hole when inserted. Similarly, a second rubber plug of the at least two rubber plugs is removably inserted into the second hole. The second rubber plug is configured to prevent the liquid coolant filled into the airspace of the tumbler from leaking out through the second hole when inserted.

Figure 1:
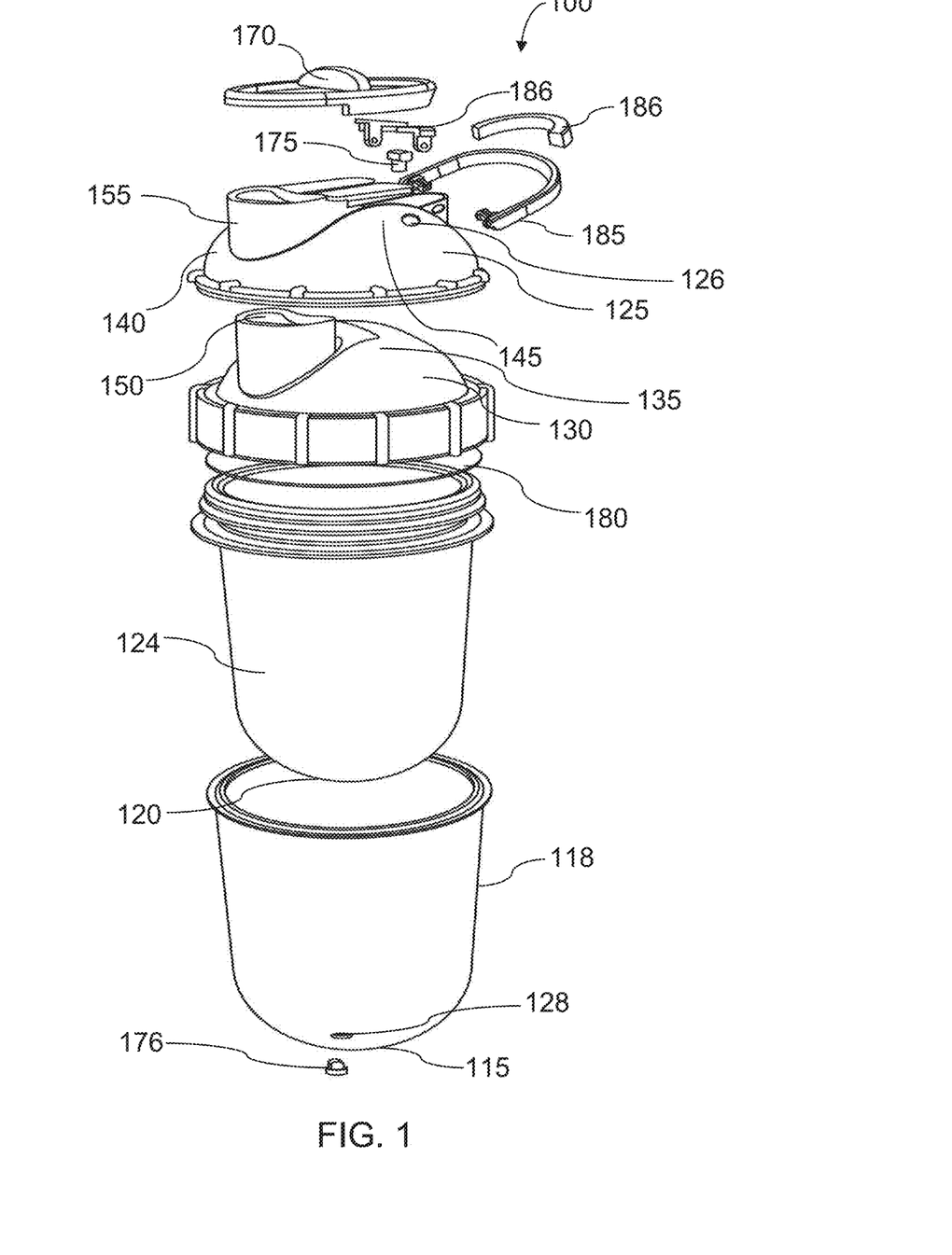
FIG. 1 is a schematic representation of a shaker bottle for preparing a health nutrient in accordance with an embodiment of the present disclosure.

FIG. 1 is a schematic representation of a shaker bottle 100 in accordance with an embodiment of the present disclosure. The bottle 100 includes a tumbler 110 having a double walled structure, wherein the tumbler includes a bottom wall internal surface and a side wall internal surface, wherein the bottom wall internal surface and the side wall internal surface are integrated to form an internal chamber adapted to hold a predefined volume of liquid and one or more consumable ingredients. In one embodiment, the tumbler may include a capsule shaped tumbler. In such embodiment, the tumbler is manufactured from stainless steel.

The tumbler 110 also includes a bottom wall external surface 115 and a side wall external surface 118 connected with the bottom wall internal surface 120 and the side wall internal surface 124 respectively through an air space arranged in between thereby forming an air cavity between the double walled structure. In one embodiment, the connection between the bottom wall external surface and the side wall external surface connected with the bottom wall internal surface and the side wall internal surface has a smooth transition surface. In some embodiment, the bottom wall external surface 115 and the bottom wall internal surface 120 have a convex shaped structure. In a specific embodiment, the air cavity is filled with a gel to provide a cooling effect. The tumbler 110 is configured to generate centrifugal force for shaking the predefined volume of liquid and the one or more consumable ingredients. The centrifugal force generated by a round, no-corners designed tumbler helps to break down the one or more consumable ingredients in a mere five seconds of shaking. In one embodiment, the one or more consumable ingredients may include at least one of protein supplements, nutritive additives, one or more meal replacement powdered ingredients, a fruit or a combination thereof.

The bottle 100 also includes a lid 125 detachably coupled to the tumbler 110 through one or more coupling mechanisms. In one embodiment, the one or more coupling mechanisms may include at least one of a threaded coupling mechanism, a snap fit connection mechanism, a friction fit connection mechanism or a combination thereof. The lid 125 includes a side wall interior surface 130 and a top wall interior surface 135 connected with a smooth transition surface to define a mixing chamber. The lid 125 also includes a side wall exterior surface 140 and a top wall exterior surface 145 connected with the side wall interior surface and the top wall interior surface through enclosed air space.

Figure 6A:
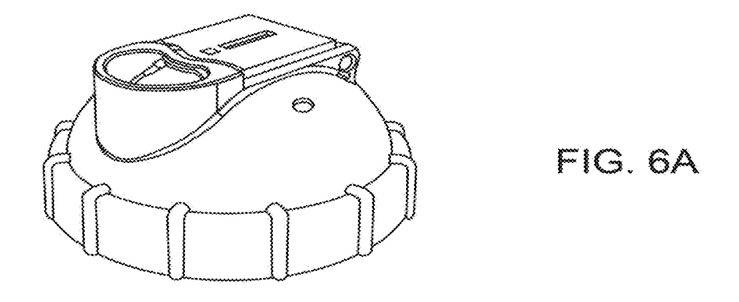
FIG. 6A represents a right front perspective view of the lid of FIG. 2.
Figure 6B:
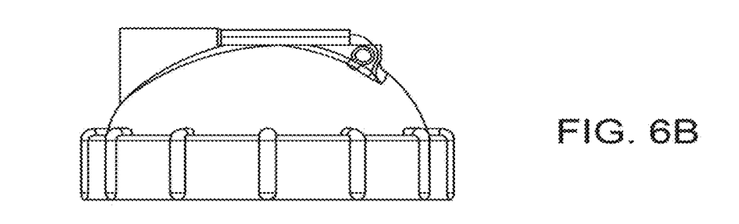
FIG. 6B represents a right side view of the lid of FIG. 6A.
Figure 6C:
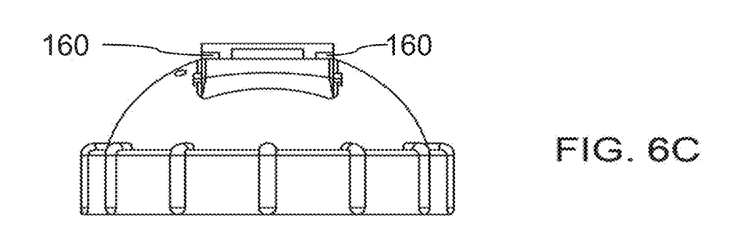
FIG. 6C represents a rear view of the lid of FIG. 6A.
Figure 6D:
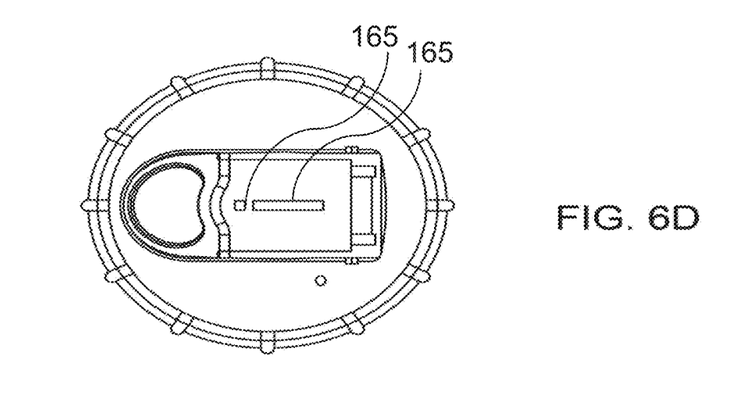
FIG. 6D represents a top view of the lid of FIG. 6A.

The lid 125 also includes an orifice 150 provided at the top wall exterior surface 145, wherein the orifice 150 is configured to dispense a content from the internal chamber of the tumbler 110 upon shaking the predefined volume of liquid and the one or more consumable ingredients. The lid 125 also includes a platform 155 arranged on the top wall exterior surface 145 of the lid 125, wherein the platform 155 is adjacent to the orifice 150 with an integral track 160 shown in FIG. 6C and a plurality of notches 165 shown in FIG. 6D, wherein the integral track 160 is disposed on sides of the platform and the notches are provided at the surface of the platform. In one embodiment, the integral track is tapered and curved.

Figure 7A:
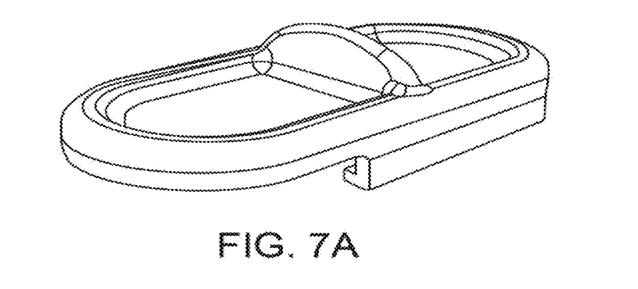
FIG. 7A is a right front perspective view of a closure for the lid of FIG. 2.
Figure 7B:
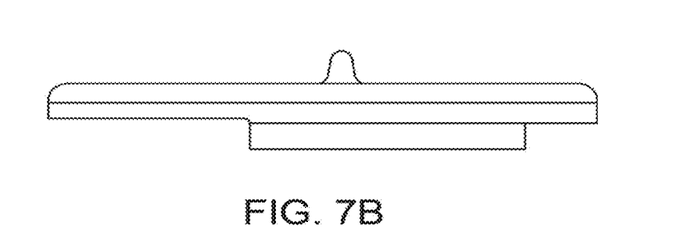
FIG. 7B is a right side view of the closure of FIG. 7A.
Figures 7C, 7D:
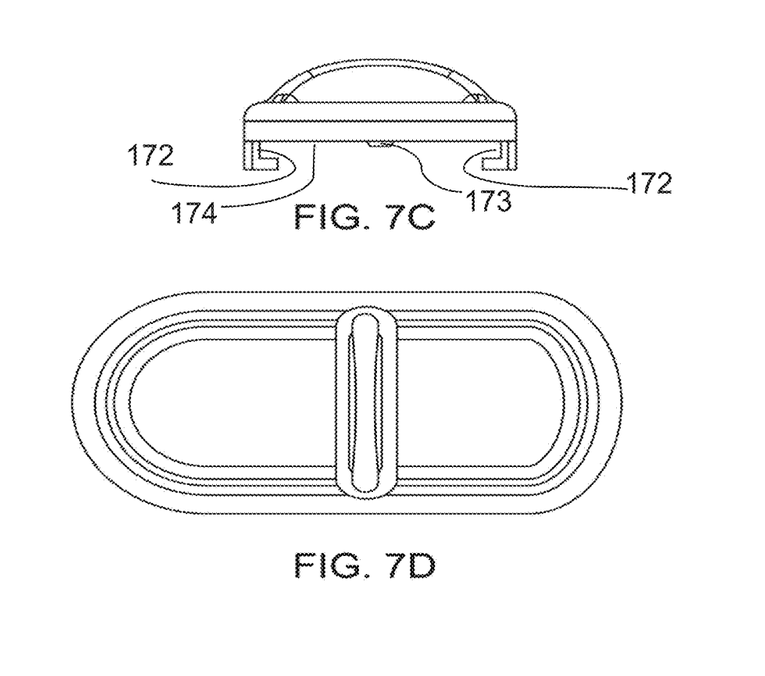
FIG. 7C is a rear view of the closure of FIG. 7A.
FIG. 7D is a top view of the closure of FIG. 7A.

The lid 125 also includes a closure 170 as shown in FIG. 1 and FIGS. 7A and 7B coupled with the platform, wherein the closure 170 is configured to open or close the orifice 150 through a sliding movement corresponding to the orifice, wherein the closure 170 at a lower surface comprises a cavity 174 with a channel 172 arranged for receiving the integral track and a resilient detent 173 arranged in spaced relation within the cavity. The resilient detent is configured for cooperating with the plurality of notches to lock the closure in a predefined position along the platform.

The bottle also includes—at least two holes 126, 128. A first hole 126 of the at least two holes 126, 128 is formed in the lid 125 such that the first hole extends from the top wall exterior surface of the lid into the enclosed airspace of the lid. A liquid coolant is filled into the enclosed airspace through the first hole 126. A second hole 128 of the at least two holes 126, 128 is formed in the tumbler such that the second hole 128 extends from the bottom wall external surface of the tumbler to the airspace. The liquid coolant is filled into the airspace through the second hole 128. Furthermore, the bottle includes at least two rubber plugs 175, 176. A first rubber plug 175 of the at least two rubber plugs 175, 176 is removably inserted into the first hole 126. The first rubber plug 175 is configured to prevent the liquid coolant filled into the enclosed airspace of the lid from leaking out through the first hole 126 when inserted. Similarly, a second rubber plug 176 of the at least two rubber plugs 175, 176 is removably inserted into the second hole. The second rubber plug 176 is configured to prevent the liquid coolant filled into the airspace of the tumbler from leaking out through the second hole 128 when inserted.

In a specific embodiment, the bottle 100 also includes a ring 180 removably coupled to the lid 125 by a threaded coupling, wherein the ring includes a grip surface for interlocking the lid 125 and the tumbler 110 to ensure leakage. In such embodiment, the ring may include an O-shaped ring 180 fabricated from a temperature insulating material.

In a particular embodiment, the lid 125 further comprises a finger loop 185 with a cover 186 coupled on the platform, wherein the finger loop 185 is configured to enable a user to hold or hang the shaker bottle.

Figure 2:
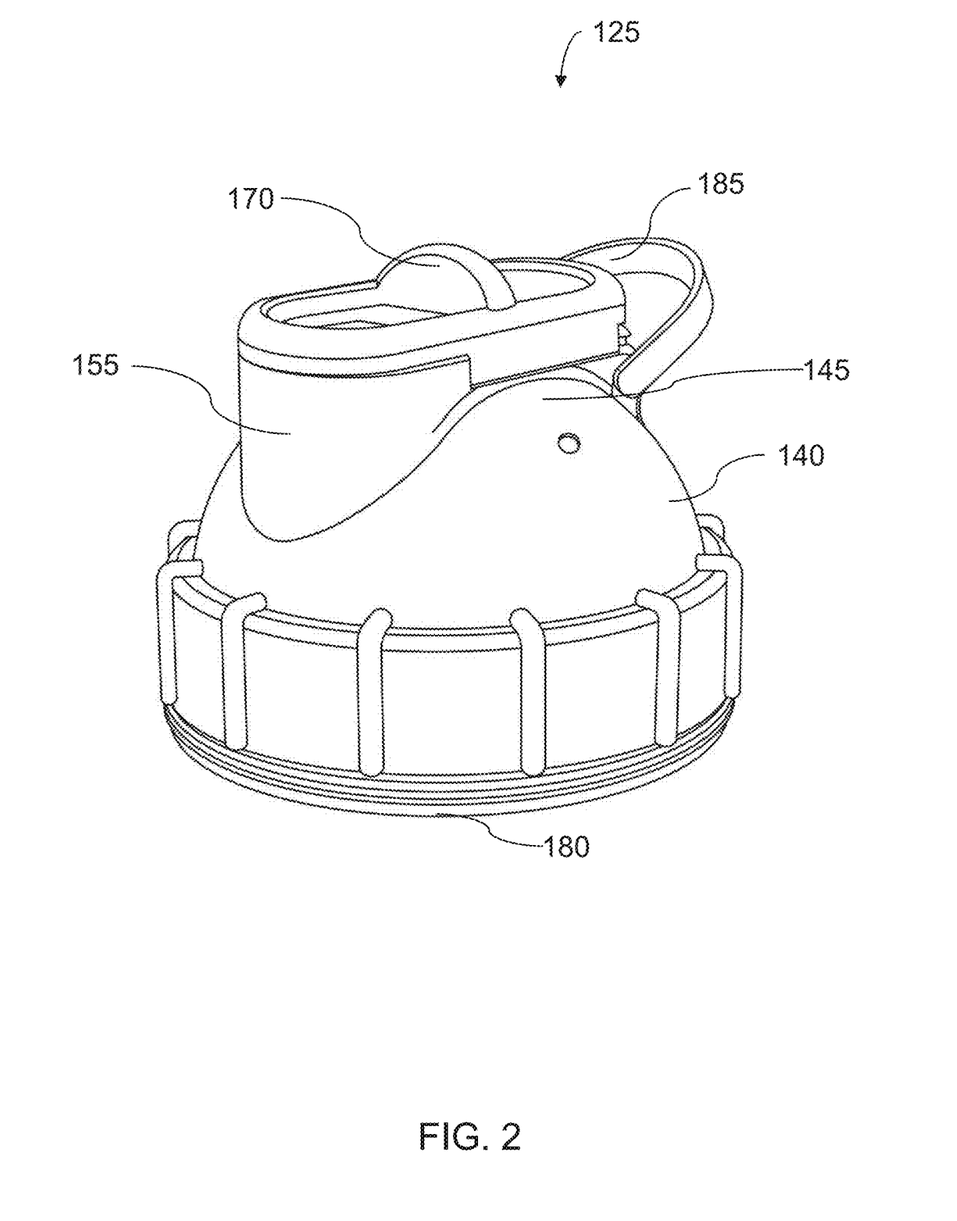
FIG. 2 represents a schematic representation of structure of a lid of a shaker bottle for preparing a health nutrient in accordance with an embodiment of the present disclosure.

FIG. 2 represents a schematic representation of structure of a lid of a shaker bottle for preparing a health nutrient in accordance with an embodiment of the present disclosure. A lid 125 is removably connected with the tumbler 110 and has a side wall internal surface 140 and a concave interior top wall surface 145. The lid 125 side wall exterior surface 130 and top wall exterior surface 135 are also concave in shape. The interior top wall surface and interior side wall surface are connected by a smooth interior transition surface defining a mixing chamber. The mixing chamber is in fluid communication with the internal chamber of the tumbler when the lid 125 is removably connected with the tumbler 110. An orifice 150 is arranged on a portion of the lid 125. The orifice may be on a portion of the lid side wall internal surface, a portion of the lid top wall or positioned on a portion of the lid side wall and the lid top wall. The lid also includes a closure arranged on an exterior surface of the lid 125 In one embodiment, the closure 170 may be a snap or friction fit. In other aspects the closure may have a sliding arrangement that is configured to lock in a plurality of positions. The lid 125 may be removably connected to the tumbler 110 by a thread on a lip of the tumbler 110 for cooperating with a thread mounted on a lip of the lid.

Figure 3:
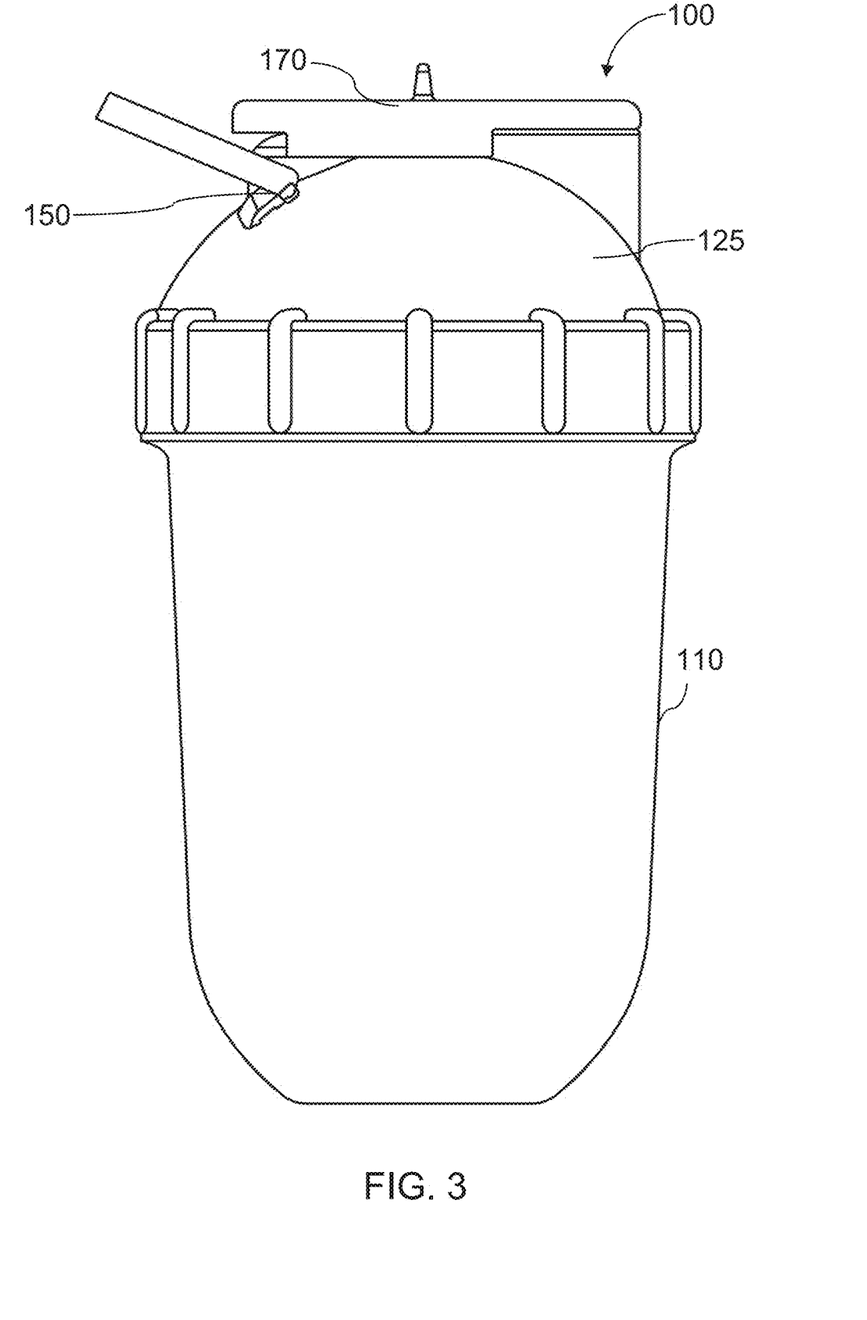
FIG. 3 is a schematic representation of a side view of a shaker bottle depicting working of the shaker bottle for preparing a health nutrient in accordance with the embodiment of the present disclosure.
Figure 4:
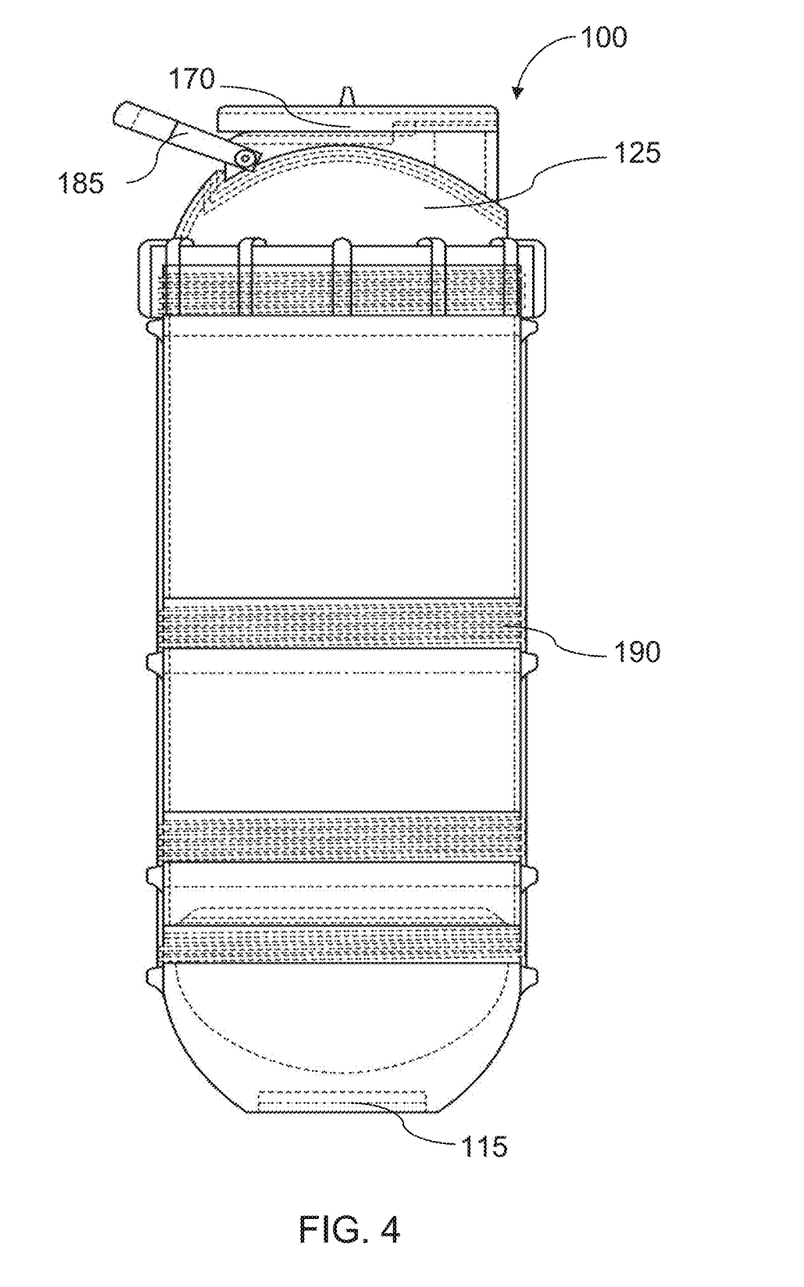
FIG. 4 depicts a schematic representation of an embodiment of a middle segment of a shaker bottle in accordance with an embodiment of a present disclosure.
Figure 5A:
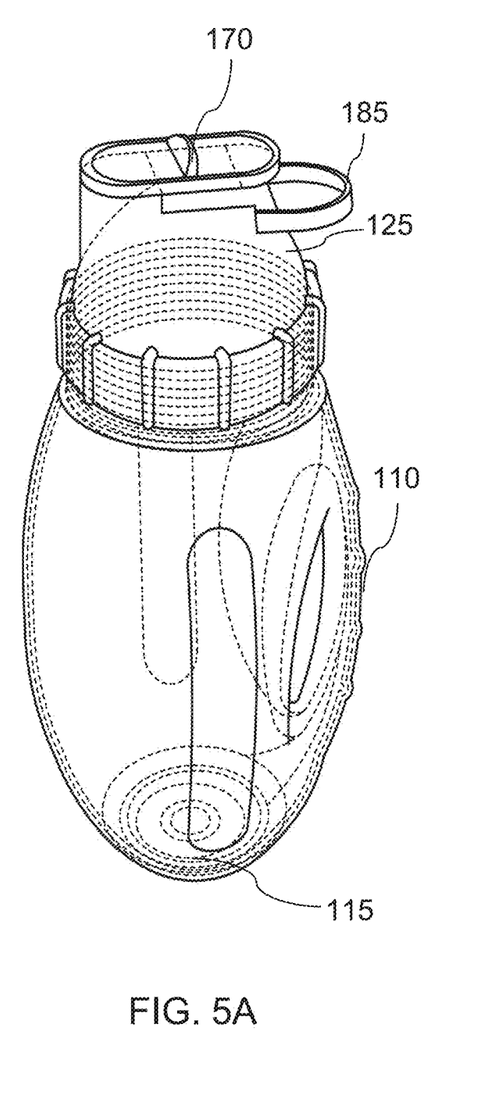
Figure 5B:
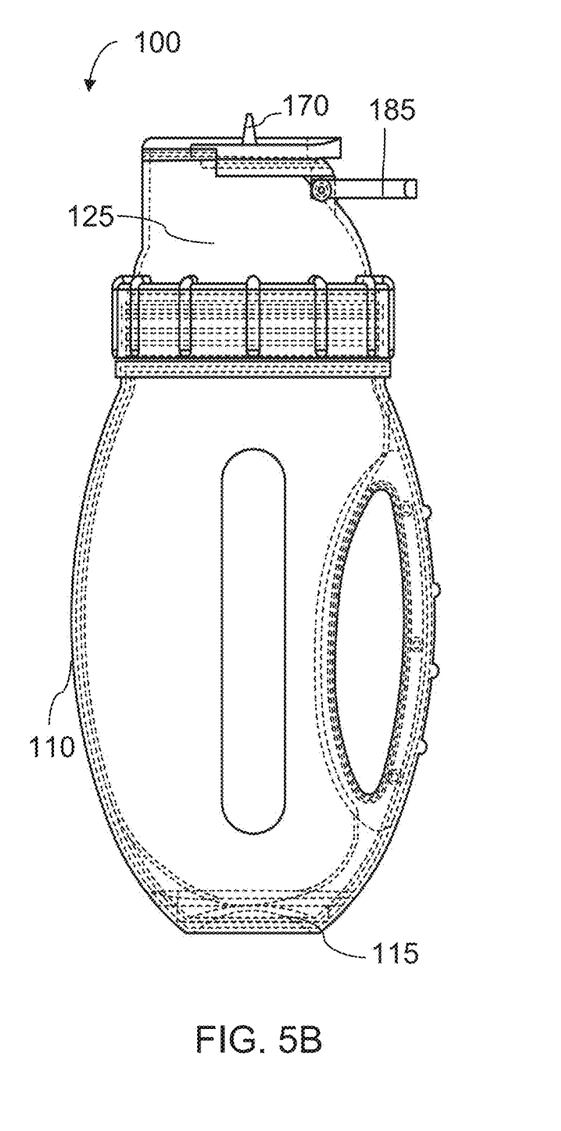

FIG. 3 is a schematic representation of a side view of a shaker bottle depicting working of the shaker bottle for preparing a health nutrient in accordance with the embodiment of the present disclosure. The bottle 100 includes a tumbler 110 and a lid 125. The tumbler 110 includes a bottom wall internal surface 120 and a side wall internal surface 124. The bottom wall internal surface 120 and the side wall internal surface 124 define an interior space or an internal chamber. The internal chamber of the bottom wall and the interior surface of the side wall are joined by an angular transition, defining a corner. Considering an example, when the predefined amount of liquid is added to the one or more consumable ingredients, the outer layer of the one or more consumable ingredients is wetted, absorbs water and is swollen, forming a thick clump of material while the one or more consumable ingredients remains dry. Because the clumped material has a higher viscosity than the predefined amount of liquid such as water, the water swelled bubble protects and prevents the core of the one or more consumable ingredients clump from contacting water outside the bubble, making it difficult to dissolve the powder core. During a shaking action, the predefined amount of liquid moves within the tumbler bottle along the arc of the transition surfaces without encountering obstacles thus maintaining a tangential velocity. Within the tumbler internal chamber and a lid mixing chamber there are no prominent features to hinder the movement of the contained liquid which further ensures continuous movement of the contents within the interior of the tumbler 110 bottle 100. Such unobstructed movement of contents enables the tumbler 110 of the bottle 100 to macerate soft fruits, as well as uniformly mix liquids with powders and/or macerated fruits. Such mixtures being sufficiently uniform so that when the contents of the tumbler are emptied, nearly zero unmixed residue remains behind as waste. The shaker bottle 100 also includes at least one interchangeable middle segment 190 coupled to the lid 125 and tumbler 110. The at least one interchangeable middle segment 190 is assembled for increasing length of the tumbler via a rotatory movement based on a predefined requirement of a user. The at least one middle segment 190 is disassembled for decreasing length of the tumbler via the rotatory movement for enabling cleaning of each section independently. One such embodiment of the at least one middle segment 190 is represented in FIG. 4. FIG. 4 depicts a schematic representation of an embodiment of a middle segment of a shaker bottle in accordance with an embodiment of a present disclosure. Similarly, another embodiment of a 1.3 litre shaker bottle in shape of a jug is represented in FIG. 5. FIG. 5 A represents a schematic representation of a front view of a shaker jug in accordance with an embodiment of a present disclosure. FIG. 5 B represents a schematic representation of a side view of a shaker jug in accordance with an embodiment of a present disclosure.

Various embodiments of the present disclosure provide a leak proof shaker bottle with a silicone seal that makes smooth protein shakes and easy to clean, thereby encourages all athletes, fitness enthusiasts, and bodybuilders craved individuals to use the portable and no-smelling shaking bottle.

Moreover, the present disclosed bottle use the centrifugal force generated by a round, no-corners design capsule shaped tumbler to break down powder supplements which not only avoids the usage of any mixing accessories but also with implementation of the concept of the centrifugal force, the process of shaking different ingredients becomes easier and faster.

Furthermore, the present disclosed bottle have no corners, so nothing gets left in the bottle when any shake is being prepared. This not only means less time is required in cleaning it, but also saves money as less powder is needed in the long run. No accumulation of waste also prevents the build-up of the foul smells which develop when undissolved powder lingers in the corners of a typical shaker bottle.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A shaker bottle comprising:
  a tumbler having a double walled structure, wherein the tumbler comprises:
    a bottom wall internal surface and a side wall internal surface, wherein the bottom wall internal surface and the side wall internal surface are integrated to form an internal chamber adapted to hold a predefined volume of liquid and one or more consumable ingredients, and
    a bottom wall external surface and a side wall external surface connected with the bottom wall internal surface and the side wall internal surface respectively through an air space arranged in between thereby forming an air cavity between the double walled structure,
    wherein the tumbler is configured to generate centrifugal force for shaking the predefined volume of liquid and the one or more consumable ingredients;
  a lid detachably coupled to the tumbler through one or more coupling mechanisms, wherein the lid comprises:
    a side wall interior surface and a top wall interior surface connected with a smooth transition surface to define a mixing chamber; and
    a side wall exterior surface and a top wall exterior surface connected with the side wall interior surface and the top wall interior surface through an enclosed air space;
    an orifice provided at the top wall exterior surface, wherein the orifice is configured to dispense a content from the internal chamber of the tumbler upon shaking the predefined volume of liquid and the one or more ingredients;
    a platform arranged on the top wall exterior surface of the lid, wherein the platform is adjacent to the orifice with an integral track and a plurality of notches, wherein the integral track is disposed on sides of the platform and the notches are provided at the surface of the platform;
    a closure coupled with the platform, wherein the closure is configured to open or close the orifice through a sliding movement corresponding to the orifice, wherein the closure at a lower surface comprises a cavity with a channel arranged for receiving the integral track and a resilient detent arranged in spaced relation within the cavity, wherein the resilient detent is configured for cooperating with the plurality of notches to lock the closure in a predefined position along the platform;

at least two holes,
wherein a first hole of the at least two holes is formed in the lid such that the first hole extends from the top wall exterior surface of the lid into the enclosed airspace of the lid, and wherein a liquid coolant is filled into the enclosed airspace through the first hole, wherein a second hole of the at least two holes is formed in the tumbler such that the second hole extends from the bottom wall external surface of the tumbler to the airspace, and wherein the liquid coolant is filled into the airspace through the second hole; and at least two rubber plugs,
wherein a first rubber plug of the at least two rubber plugs is removably inserted into the first hole, wherein the first rubber plug is configured to prevent the liquid coolant filled into the enclosed airspace of the lid from leaking out through the first hole when inserted; and wherein a second rubber plug of the at least two rubber plugs is removably inserted into the second hole, wherein the second rubber plug is configured to prevent the liquid coolant filled into the airspace of the tumbler from leaking out through the second hole when inserted.

2. The shaker bottle according to claim 1, wherein the tumbler comprises a capsule shaped tumbler.

3. The shaker bottle according to claim 1, wherein the tumbler is manufactured from stainless steel.

4. The shaker bottle according to claim 1, wherein the connection between the tumbler and the lid has a smooth interior transition surface.

5. The shaker bottle according to claim 1, wherein the air cavity is filled with a gel to provide a cooling effect.

6. The shaker bottle according to claim 1, wherein the one or more consumable ingredients comprises at least one of protein supplements, nutritive additives, one or more meal replacement powdered ingredients, a fruit or a combination thereof.

7. The shaker bottle according to claim 1, wherein the one or more coupling mechanisms comprises at least one of a threaded coupling mechanism, a snap fit connection mechanism, a friction fit connection mechanism or a combination thereof.

8. The shaker bottle according to claim 1, wherein the integral track is tapered and curved.

9. The shaker bottle according to claim 1, comprising a ring removably coupled to the lid by a threaded coupling, wherein the ring comprises a grip surface for interlocking the lid and the tumbler to ensure leakage.

10. The shaker bottle according to claim 9, wherein the ring comprises an O-shaped ring fabricated from a temperature insulating material.

11. The shaker bottle according to claim 1, wherein the lid comprises a finger loop with a cover coupled on the platform, wherein the finger loop is configured to enable a user to hold or hang the shaker bottle.

12. The shaker bottle according to claim 1, comprising at least one interchangeable middle segment coupled to the lid and tumbler, wherein the at least one interchangeable middle segment is assembled for increasing length of the tumbler via a rotatory movement based on a predefined requirement of a user.

13. The shaker bottle according to claim 12, wherein the at least one middle segment is disassembled for decreasing length of the tumbler via the rotatory movement for enabling cleaning of each section independently.

* * * * *